Patented Nov. 18, 1947

2,430,946

UNITED STATES PATENT OFFICE 2,430,946

PURIFICATION OF PENICILLIN

Richard Pasternack, Islip, N. Y., and Peter P. Regna, West New York, N. J., assignors to Chas. Pfizer & Co., Inc., Brooklyn, N. Y., a corporation of New Jersey No Drawing. Application December 18, 1944, Serial No. 568,782

8 Claims. (Cl. 260—236.5)

This invention relates to the purification of penicillin and has for its object to provide a novel and improved process for this purpose.

Another object of the invention is to purify crude penicillin by coupling impurities therein with a substance which enables the resulting product to be separated from the penicillin by physical means without appreciable loss of active material.

Still another object of the invention is to remove impurities from penicillin by changing the solubilities of said impurities in such a way that they can be readily separated from the active material.

Various other objects and advantages will be apparent as the nature of the invention is more fully disclosed.

At the present time, penicillin made by fermentation is not a single chemical substance, but a mixture of several related therapeutically active compounds of as yet undetermined structure (some of which form readily crystallizable sodium salts) with colored impurities and other metabolic products of the generating mold. Separation of the metabolic by-products and other impurities by physical means is difficult because of the similarity of their physical properties to those of the more desirable constituents of the mixture. Removal of the impurities, however, is important because, although not seriously toxic, they make the material hygroscopic and thus indirectly decrease its stability in addition to injuring its appearance. Moreover, they impede crystallization of the portion capable of forming therapeutically valuable crystallized sodium salts. In the presence of such impurities, the yield of crystallized material is small and the loss of active material heavy.

We have now found that some of the impurities responsible for these defects may be coupled with aryl diazonium salts. In accordance with the present invention this is accomplished by treating the penicillin mixture in buffered aqueous solution with an aryl diazonium salt, the latter being present in slight excess as shown by tests known in the art. The impurities are coupled to form highly colored azo compounds. As their properties and particularly their solubilities are distinctly changed by the treatment, they may be separated by various means such as by extraction with selective solvents, filtration, etc. Suitable buffers are those which maintain the acidity of the solution below the point at which it is destructive to penicillin. Examples are: sodium acetate, sodium citrate, disodium phosphate. The latter is especially suitable and in general we prefer it. Good results may also be obtained by adding a suitable neutralizing agent such as sodium bicarbonate solution simultaneously with the diazonium salt.

A further advantage resulting from the process of our invention is that it facilitates isolation of the crystallized sodium salt of penicillin in maximum yield. When crystallized sodium penicillin is prepared from material treated by our process, there is little or no loss of therapeutically active material because the mother liquors are of satisfactory purity and may be freeze-dried directly to recover penicillin of therapeutic quality.

Our process is not limited to any particular class of aryl diazonium salts. Satisfactory results are obtained with diazonium phosphates, chlorides or sulfates, prepared from primary amines of the benzene and naphthalene series and their alkyl, aryl, oxyalkyl, sulfonyl, carboxyl, and nitro derivatives. Diazonium phosphates are especially suitable since they can be used in the presence of corrosion-resisting metals, such as stainless steel. Resulting azo compounds which contain sulfonyl groups in the molecule are water-soluble but do not to any substantial degree dissolve in organic solvents. Corresponding azo compounds which do not contain sulfonyl groups are soluble at neutral pH in the same organic solvents which will dissolve penicillin only at an acid reaction. Suitable solvents are, for example, chloroform, ethyl and isopropyl ethers and solvent acetate esters. The azo compounds which form when para methyl benzenediazonium salts are used are only slightly soluble in water, so that they be largely removed by filtration if desired. In addition, they are soluble in organic solvents and may be extracted from aqueous suspension or solution at neutral pH.

To the extent that these azo compounds are extracted from acidified aqueous solution along with the penicillin by the organic solvents used, they may be eliminated from the organic solvent if desired by treating the solution with a minimal amount of activated carbon. However, the amount of such azo compounds extractable with the penicillin is insignificant, and they are not toxic.

*Example 1.—Improving the purity of crude penicillin*

One liter of a crude aqueous solution containing 1,165,000 units of penicillin (potency when directly freeze-dried, 40 units per milligram) is buffered by the addition of 10 grams disodium phosphate. The solution is cooled to 0° C. and 6 grams of para sulfonyl benzenediazonium phosphate is run in slowly with stirring. Rapid coupling is evidenced by the formation of a red azo compound which is completely water-soluble. After five minutes stirring the reaction mixture is acidified to pH 2 with sulphuric acid, extracted with two successive 200 cc. portions of isopropyl acetate and the aqueous residue discarded. A trace of colored azo compound dissolved by the organic solvent is removed by stirring for two minutes with 0.4 gram of an activated vegetable decolorizing charcoal, which is then filtered out and discarded. The resulting solution of penicillin in isopropyl acetate, containing 95% of the penicillin originally present, is repeatedly extracted with small portions of dilute aqueous sodium bicarbonate until the pH has risen to 7.1. The aqueous solution of sodium penicillin thus obtained is freeze-dried, yielding approximately 1 gram of the purified material having a potency of 900 units per milligram.

*Example 2.—Preparation of crystallized sodium penicillin*

12,465,000 units of crude sodium penicillin, dissolved in 500 cc. of water containing 10 grams of disodium phosphate, is treated as in Example 1 except that the benzenediazonium chloride prepared from 4 grams of aniline is used for the coupling treatment. After removal of the azo compound by extraction with chloroform, the aqueous solution is acidified with potassium acid sulfate to pH 2, and extracted with isopropyl acetate, which is then treated with 1 gram of activated carbon and re-extracted with dilute aqueous sodium bicarbonate solutions to pH 7.4. On dehydration, as in Example 1, this gives about 7.75 grams of sodium penicillin with a potency of 1,380 units per milligram. The product which is still somewhat yellow in color, is re-crystallized from 100 cc. of dry acetone, the first crop of crystals appearing within a few minutes. After standing several hours, a yield of 3.7 grams or 44.5% by weight of purified sodium penicillin having a potency of 1,500 units per milligram is recovered. It is almost pure white in color. The mother liquor is directly freeze-dried to recover therapeutic penicillin. By comparison, 94 milligrams of dry material obtained from another portion of the same crude solution by the usual process not involving treatment with diazonium salts, after solution in 1½ cc. of dry acetone yields no crystalline penicillin.

*Example 3.—Treatment of a concentrated crude penicillin solution*

The product obtained by freeze-drying a portion of this liquor has a potency of 40 units per milligram. A second portion of one liter of the crude solution containing 1,900,000 units of penicillin is treated as in Example 1 using the para sulfonyl diazonium chloride prepared from 20 grams of sulfanilic acid. The product has a potency of 840 units per milligram. A third portion of the crude liquid treated exactly like the second except that no diazonium compound is added is found to have after freeze-drying a potency of 600 units per milligram.

The portion treated with diazonium chloride yields a recovery of 92%, based upon the units put into the process.

*Example 4.—Coupling with a diazonium compound containing two sulfonyl groups.*

1½ grams of 1-amino-8-naphthol-3,6-disulfonic acid is suspended in 25 cc. water and neutralized with sodium carbonate to complete solution. This is cooled to 0° C., 0.35 gram sodium nitrite added, and the mixture poured into a solution of 5 cc. of 85% $H_3PO_4$ containing ice and 10 grams $Na_2HPO_4$. The resulting diazonium phosphate is added with stirring to 97 cc. of a cold solution of crude penicillin having a total potency of 3,000,000 units. Rapid coupling is evidenced by immediate formation of a purple dye which is completely water soluble. The solution is acidified to pH 2 and the penicillin extracted with chloroform. The chloroform solution is then extracted with dilute sodium bicarbonate solution to pH 7.2. The freeze-dried product, after further drying over barium oxide, has a potency of 1050 units per milligram.

We claim:
1. In the process of purifying crude penicillin, the step of treating a salt of the penicillin in aqueous solution with a diazotized aryl amine which couples with impurities to form colored azo compounds, separating said azo compounds from the penicillin and recovering the purified penicillin.

2. Process of purifying crude sodium penicillin comprising treating its aqueous solution with an aryl diazonium salt which couples with impurities present to form colored azo compounds, separating said azo compounds from the penicillin and recovering the purified penicillin.

3. Process for removing impurities present in crude penicillin comprising treating the crude penicillin in buffered aqueous solution with an aryl diazonium salt, which couples with some of the impurities present to form colored azo compounds, separating the azo compounds thus formed from the penicillin solution, acidifying said penicillin solution, extracting the penicillin into an organic solvent, and recovering the penicillin from the latter.

4. Process of preparing crystallized sodium penicillin of improved quality from crude penicillin solutions, comprising treating the crude solution with an aryl diazonium salt, while maintaining the pH at a value not destructive to penicillin, separating the penicillin from the resulting colored azo compounds by extracting with an organic solvent, extracting the penicillin from the organic solvent with dilute aqueous sodium bicarbonate solution, freeze-drying the resulting aqueous solution to recover sodium penicillin, and crystallizing it from an organic solvent.

5. Process of purifying crude sodium penicillin comprising treating its aqueous solution with an aryl diazonium salt, which couples with impurities present to form colored azo compounds which are readily separable from the penicillin, acidifying the reaction mixture, extracting same with an organic solvent, and recovering the purified penicillin from said solvent.

6. Process of purifying crude sodium penicillin comprising adding disodium phosphate to the crude aqueous solution of penicillin, treating said solution with a para sulfonyl benzenediazonium salt to form colored water-soluble azo compounds which are substantially insoluble in organic solvents, acidifying the reaction mixture and extracting the latter with an organic solvent, and recovering the purified penicillin from said solvent.

7. Process of purifying crude sodium penicillin comprising adding disodium phosphate to the crude aqueous solution of penicillin, treating said solution with para sulfonyl benzenediazonium phosphate to form colored water-soluble azo compounds which are substantially insoluble in organic solvents, acidifying the reaction mixture and extracting the latter with an organic solvent, and recovering the purified penicillin from said solvent.

8. Process of purifying crude sodium penicillin comprising treating its aqueous solution with an aryl diazonium salt containing at least one sulfonic group, and extracting said solution with an organic penicillin solvent which dissolves the penicillin and not the color azo compound, and recovering the purified penicillin from said solvent.

RICHARD PASTERNACK.
PETER P. REGNA.

REFERENCES CITED

The following references are of record in the file of this patent:

Science, February 26, 1943, pages 205–206.
Science, December 21, 1945, vol. 102, pages 627–629.